United States Patent
Xing

(10) Patent No.: US 11,785,633 B2
(45) Date of Patent: Oct. 10, 2023

(54) BASE STATION RADIO RESOURCE MANAGEMENT FOR NETWORK SLICES

(71) Applicant: T-Mobile USA, Inc., Bellevue, WA (US)

(72) Inventor: Shuqing Xing, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 98 days.

(21) Appl. No.: 17/096,836

(22) Filed: Nov. 12, 2020

(65) Prior Publication Data

US 2021/0368514 A1   Nov. 25, 2021

Related U.S. Application Data

(60) Provisional application No. 63/027,277, filed on May 19, 2020.

(51) Int. Cl.
H04W 72/543     (2023.01)

(52) U.S. Cl.
CPC ................................. H04W 72/543 (2023.01)

(58) Field of Classification Search
CPC ... H04W 72/087; H04W 28/24; H04W 24/02; H04L 41/0806; H04L 41/0816;
(Continued)

(56) References Cited

U.S. PATENT DOCUMENTS 10,149,193 B2  12/2018 Cui et al.
10,477,457 B2  11/2019 Park et al.
(Continued)

FOREIGN PATENT DOCUMENTS

EP        2816858 A1    12/2014
WO   WO2017035300 A1     3/2017
(Continued)

OTHER PUBLICATIONS

3GPP, "Management and orchestration; Concepts, use cases and requirements", Technical Specification (TS) 28.530, 3rd Generation Partnership Project, Oct. 2018, 32 pages.
(Continued)

*Primary Examiner* — Charles C Jiang
*Assistant Examiner* — Shawn D Miller
(74) *Attorney, Agent, or Firm* — Lee & Hayes, P.C.

(57) ABSTRACT

A real-time slice manager at a base station of a telecommunication network can manage radio resources allocated to network slices. The real-time slice manager can receive input factors associated with one or more network slices, including loading information, latency information, radio conditions, and other input factors. If the real-time slice manager determines that a network slice is not meeting a goal, such as a goal defined in a Service Level Agreement (SLA), the real-time slice manager can locally adjust radio resources allocated to one or more network slices, and/or treatment of network slices in a transport link or core network, to increase the likelihood that the network slice will meet the goal. The real-time slice manager can thus dynamically manage network slices at the base station to efficiently use available radio resources, manage network functions in the core network and/or transport link, and meet goals for the network slices.

20 Claims, 5 Drawing Sheets

(58) Field of Classification Search
CPC ..... H04L 41/145; H04L 41/147; H04L 41/16; H04L 41/5054; H04L 43/0852; H04L 43/0888; H04L 41/0896; H04L 41/5009; H04L 41/5019

See application file for complete search history.

(56) References Cited

U.S. PATENT DOCUMENTS

| | | | |
|---|---|---|---|
| 10,582,432 | B2 | 3/2020 | Park et al. |
| 10,616,934 | B2 | 4/2020 | Talebi Fard et al. |
| 10,681,589 | B1 | 6/2020 | Dowlatkhah et al. |
| 11,387,970 | B2 | 7/2022 | Loehr et al. |
| 2017/0079059 | A1 | 3/2017 | Li et al. |
| 2017/0135099 | A1* | 5/2017 | Song ............... H04W 76/25 |
| 2017/0339688 | A1 | 11/2017 | Singh et al. |
| 2018/0123878 | A1* | 5/2018 | Li ............... H04L 41/122 |
| 2018/0183551 | A1 | 6/2018 | Chou et al. |
| 2019/0246442 | A1 | 8/2019 | Park et al. |
| 2019/0253917 | A1 | 8/2019 | Dao |
| 2020/0044723 | A1 | 2/2020 | Cirik et al. |
| 2020/0100137 | A1* | 3/2020 | Panchal ............... H04W 24/02 |
| 2020/0245233 | A1 | 7/2020 | Qian et al. |
| 2021/0158151 | A1* | 5/2021 | Wang ............... H04L 12/189 |
| 2021/0160153 | A1* | 5/2021 | Akman ............... H04L 41/0896 |
| 2021/0298038 | A1 | 9/2021 | Kang et al. |
| 2021/0345300 | A1 | 11/2021 | Selvanesan et al. |
| 2022/0070104 | A1 | 3/2022 | Luo et al. |
| 2022/0078663 | A1 | 3/2022 | Luo et al. |
| 2022/0078857 | A1 | 3/2022 | Kim |
| 2022/0131582 | A1 | 4/2022 | Park et al. |
| 2022/0167408 | A1 | 5/2022 | Lee et al. |
| 2022/0174766 | A1 | 6/2022 | Zhou et al. |
| 2022/0201556 | A1 | 6/2022 | Yang et al. |
| 2022/0225292 | A1 | 7/2022 | Mohammad Soleymani et al. |

FOREIGN PATENT DOCUMENTS

| | | |
|---|---|---|
| WO | WO2017074486 A1 | 5/2017 |
| WO | WO2017097227 A1 | 6/2017 |
| WO | WO2017172789 A1 | 10/2017 |
| WO | WO2017177364 A1 | 10/2017 |
| WO | WO2018121621 A1 | 7/2018 |
| WO | WO2019152213 A1 | 8/2019 |

OTHER PUBLICATIONS

3GPP, "NR: Physical channels and modulation", Technical Specification (TS) 38.211, 3rd Generation Partnership Project, Mar. 2019, 98 pages.

3GPP, "NR; NR and NG-RAN Overall description; Stage-2", Technical Specification (TS) 38.300, 3rd Generation Partnership Project, Jul. 2020, 150 pages.

3GPP, "NR; Physical layer procedures for data", Technical Specification (TS) 38.214, 3rd Generation Partnership Project, Jul. 2019, 95 pages.

3GPP, "NR; Physical layer procedures for control", Technical Specification (TS) 38.213, 3rd Generation Partnership Project, Jul. 2019, 110 pages.

3GPP, "Procedures for the 5G System", Technical Specification (TS) 28.502, 3rd Generation Partnership Project, Jun. 2018, 311 pages.

3GPP, "System architecture for the 5G System (5GS)", Technical Specification (TS) 23.501, 3rd Generation Partnership Project, Apr. 2019, 242 pages.

3GPP, "Technical Specification Group Services and System Aspects; Release 15 Description; Summary of Rel-15 Work Items (Release 15)", vol. TSG SA, No. V0.6.0, Feb. 4, 2019, pp. 1-122.

Extended European Search Report dated Oct. 29, 2021 for European Patent Application No. 21173816.6, 12 pages.

Office Action for U.S. Appl. No. 17/096,799, dated Mar. 16, 2022, Xing, "Bandwidth Part Configuration for Network Slicing", 27 pages.

Office Action for U.S. Appl. No. 17/324,013, dated Sep. 15, 2022, Shuqing Xing, "Base Station Management of End-to-End Network Latency", 19 pages.

S2-189055, "New key issue and solution for the enhancement of PDB provision", 3GPP, Aug. 24, 2018.

* cited by examiner

BASE STATION RADIO RESOURCE MANAGEMENT FOR NETWORK SLICES

RELATED APPLICATIONS

This U.S. Patent Application claims priority to provisional U.S. Patent Application No. 63/027,277, entitled "Real Time Radio Resource Management in Network Slicing," filed on May 19, 2020, the entirety of which is incorporated herein by reference.

BACKGROUND

Network slicing can be used to create different virtual networks within a telecommunication network. For example, network resources can be allocated among different network slices. Each network slice can thus be used as an independent virtual network, because each network slice may be associated with different network resources.

In some cases, different network slices may be associated with different use cases, services, or applications. For instance, a fifth generation (5G) core network may create different network slices for Enhanced Mobile Broadband (eMBB) applications, Massive Internet of Things (MIoT) applications, Ultra-Reliable Low Latency Communication (URLLC) applications, vehicle-to-everything (V2X) applications, and/or other types of applications.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Introduction

Figure 1:
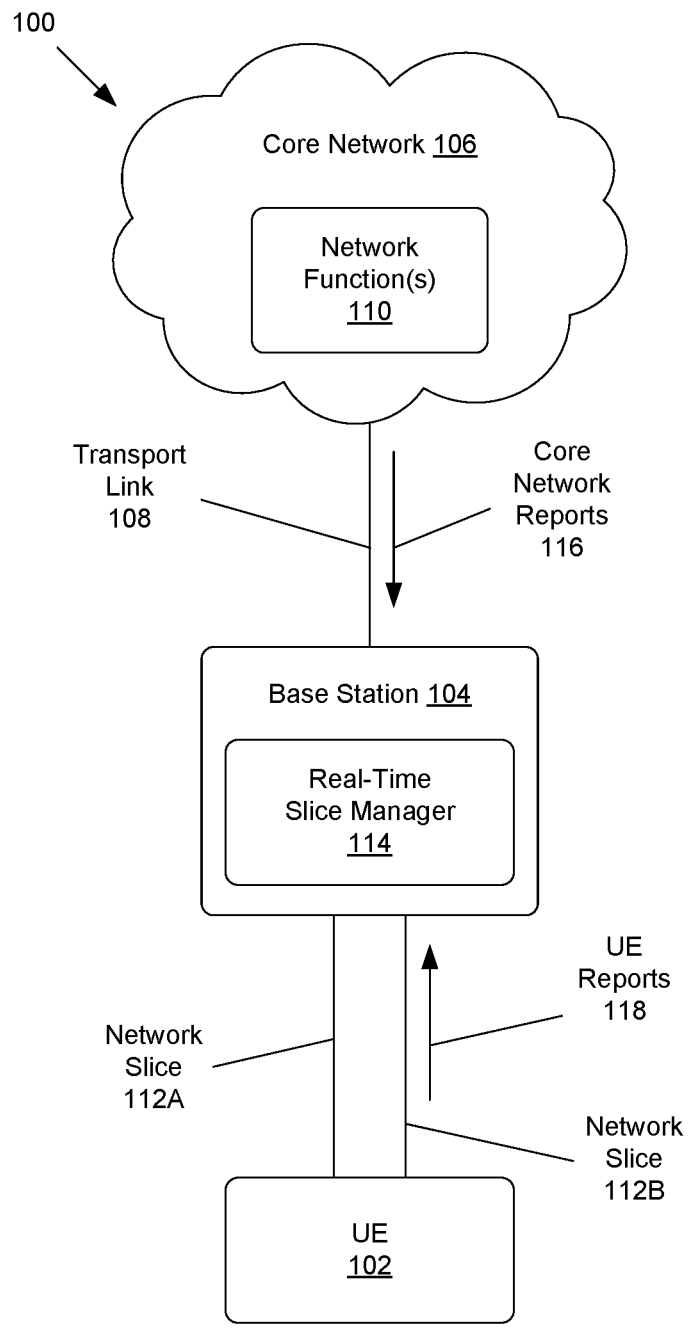
FIG. 1 shows an example network environment, in which a real-time slice manager at a base station can manage network slices associated with the base station.

Network slicing allows an operator of a telecommunication network to create multiple network slices on a shared physical infrastructure. Each network slice can operate as an independent virtual end-to-end network. In some examples, different network resources can be allocated to each network slice. Accordingly, network slices that use different network resources may be effectively isolated from one another, such that issues with one network slice may be unlikely to impact another network slice.

In many existing systems, a centralized slice orchestrator in a core network may be responsible for creating and managing network slices. As an example, a core network slice orchestrator may create different network slices for different types of applications, services, or use cases. For example, one network slice may be provided for URLLC services, while another network slice may be provided for eMBB services. The core network slice orchestrator may allocate network resources among the network slices based on the associated use cases. For example, resources of the core network, a radio access network (RAN), and/or an intermediate transport network that may lead to low latency metrics can be allocated to a URLLC network slice, while other resources that may lead to high data throughput metrics can be allocated to an eMBB network slice.

However, after a network slice has been created by a core network, issues may occur that affect latency metrics, throughput metrics, reliability metrics, and other metrics for the network slice. In some cases, such issues may occur locally within the RAN. For example, changes in local radio conditions between a user equipment (UE) and a base station in the RAN can impact latency and throughput metrics associated with one or more network slices. Such issues may exist locally for each individual base station in the RAN, and/or be different for each base station.

Accordingly, even if a centralized slice orchestrator in the core network is able to adjust network resources that are allocated to individual network slices, the centralized slice orchestrator may not be able to easily or quickly address local issues at each individual base station that may be locally impacting network slices. For instance, if local radio conditions are negatively impacting latency metrics for a particular network slice associated with a particular base station, in many existing systems that base station would need to wait for the centralized core network slice orchestrator to recognize the problem and determine how to reallocate resources among network slices to address the problem. This process can take time, during which the local latency problems may persist and negatively impact user experiences.

The systems and methods described herein can enable a base station to locally manage and dynamically adjust radio resources allocated to one or more network slices in real-time. For example, based on one or more input factors that indicate a performance issue with a first network slice, the base station may determine in real-time to reallocate a portion of spectrum from another network slice to the first network slice to attempt to resolve the performance issue. As another example, the base station may determine in real-time, based on one or more input factors, to adjust attributes of radio resources that have been allocated to one or more network slices. For example, if input factors indicate that a goal associated with a network slice is not being met, the base station can adjust radio resources allocated that network slice and/or other network slices to increase the likelihood of meeting the goal.

Example Environment

FIG. 1 shows an example network environment 100 in which a UE 102 can connect to a telecommunication network to engage in communication sessions for voice calls, video calls, messaging, data transfers, and/or any other type of communication. The UE 102 can be any device that can wirelessly connect to the telecommunication network. In some examples, the UE 102 can be a mobile phone, such as a smart phone or other cellular phone. In other examples, the UE 102 can be an Internet of Things (IoT) device, a personal digital assistant (PDA), a media player, a tablet computer, a gaming device, a smart watch, a hotspot, a personal computer (PC) such as a laptop, desktop, or workstation, or any other type of computing or communication device.

The telecommunication network can include a base station 104. The base station 104 can be part of a radio access network (RAN) that includes base stations and/or other access points to which the UE 102 can connect. In some examples, the RAN can be a virtual and/or open RAN, a cloud-based RAN, and/or a RAN or other type of access network that has any other type of structure or architecture. The telecommunication network can also have a core network 106 linked to the base station 104 and other elements of the RAN. For example, a transport link 108 can connect the base station 104 to one or more elements of the core network 106. The transport link 108 can include fiber optic connections, microwave connections, and/or other type of backhaul data connection that connects the base station 104 to the core network 106 directly or via one or more intermediate network elements. In some examples, one or more edge computing elements can be part of the transport link 108, or be positioned between the base station 104 and the transport link 108, such that the edge computing elements can perform operations at positions that are closer to the base station 104 than the core network 106. Overall, the UE 102 can wirelessly connect to the base station 104 in the RAN, and in turn be connected to the core network 106 via the base station 104 and the transport link 108. The core network 106 may also link the UE 102 to an Internet Protocol (IP) Multimedia Subsystem (IMS), the Internet, and/or other networks.

The UE 102, the base station 104, the RAN, and/or the core network 106 can be compatible with one or more radio access technologies, wireless access technologies, protocols, and/or standards. For example, the UE 102, the base station 104, and/or the core network 106 can support fifth generation (5G) New Radio (NR) technology, Long-Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, WiFi® technology, and/or any other previous or future generation of radio access technology.

In some examples, the RAN can be a 5G access network, and the base station 104 can be a 5G base station known as a gNB. The core network 106 can, in some examples, also be based on 5G. For instance, the core network 106 can be a 5G core network (5GC). In other examples, the base station 104 and/or the core network 106 can be based on LTE technologies. For instance, the base station 104 may be an LTE eNB and/or the core network 106 can be an LTE packet core network known as an Evolved Packet Core (EPC).

The base station 104 and the UE 102 may support data transmissions at frequencies in one or more spectrum bands, such as low band frequencies under 1 GHz, mid-band frequencies between 1 GHz and 6 GHz, and/or high band frequencies above 6 GHz, including millimeter wave (mmW) frequencies above 24 GHz. As an example, a gNB may be configured to support one or more of the bands shown below in Table 1, and/or one or more other bands.

TABLE 1

Example Bands in 5G NR Spectrum

| Band | Shorthand Frequency (MHz) | Uplink Band (MHz) | Downlink Band (MHz) |
|---|---|---|---|
| n2 (Mid-Band) | 1900 | 1850-1910 | 1930-1990 |
| n12 (Low Band) | 700 | 699-716 | 729-746 |
| n25 (Mid-Band) | 1900 | 1850-1915 | 1930-1995 |
| n41 (Mid-Band) | 2500 | 2496-2690 | 2496-2690 |
| n66 (Mid-Band) | 1700 | 1710-1780 | 2110-2200 |
| n71 (Low Band) | 600 | 663-698 | 617-652 |
| n260 (mmW) | 39000 (39 GHz) | 37000-40000 | 37000-40000 |
| n261 (mmW) | 28000 (28 GHz) | 27500-28350 | 27500-28350 |

Figure 2:
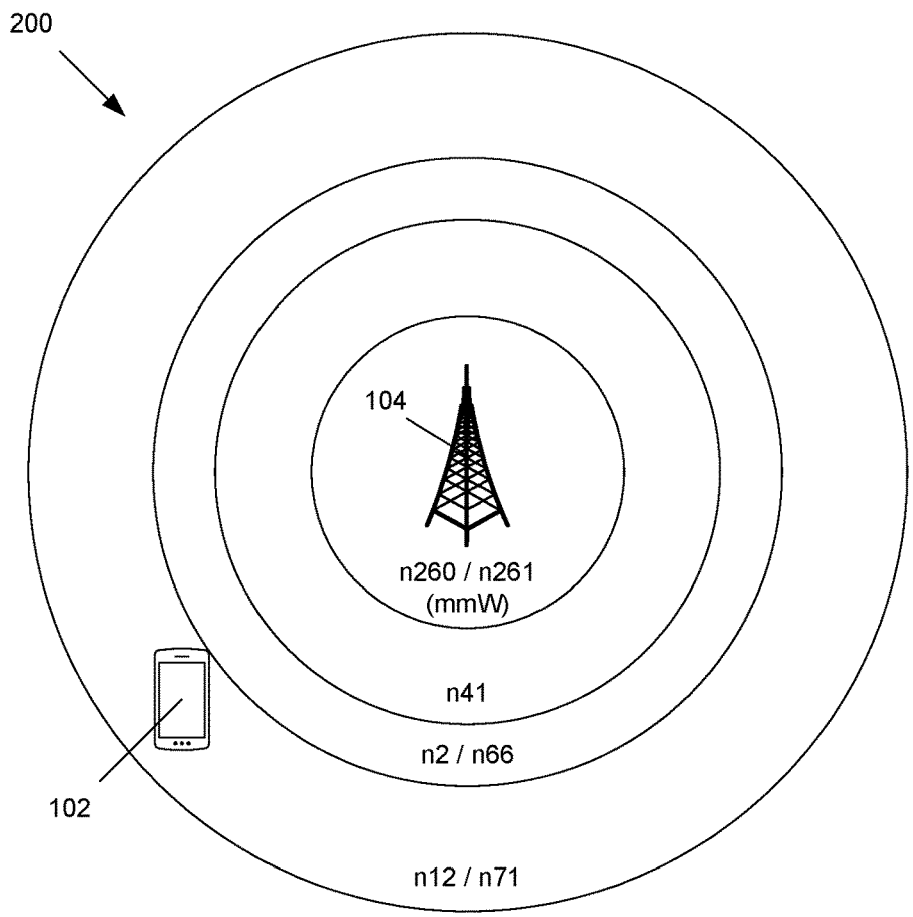
FIG. 2 shows an example of coverage areas associated with different spectrum bands.

Different spectrum bands may have different attributes and/or cover different geographical areas. For instance, FIG. 2 shows a non-limiting example 200 in which, in some situations, low bands may cover the largest geographical areas, mid-bands may cover smaller geographical areas than the low bands, and mmW bands and other high bands may cover smaller geographical areas than the low bands and/or mid-bands.

Additionally, different frequencies and spectrum bands may be associated with different metrics or characteristics, such as latency, throughput, reliability, supported bandwidths, and/or other metrics or characteristics. For example, in some situations mmW bands may be capable of providing higher throughput and/or lower latencies than mid-bands or low bands. As another example, low band frequencies may propagate farther and/or have better penetration than higher frequencies, such that low bands can be more accessible than mid-bands or high bands in some cases.

In some examples, the base station 104 can change attributes associated with transmissions at different bands, or in different portions of bands. For example, 5G transmissions can use orthogonal frequency-division multiplexing (OFDM), which can allow scalable subcarrier spacing in at least some bands. For instance, in 5G the subcarrier spacing can be set at different values including 15 kHz, 30 kHz, 60 kHz, 120 kHz, or 240 kHz. In some cases, using smaller subcarrier spacing values can lead to larger OFDM symbol durations, which can make transmissions more resilient to multi-path delay spread and thereby increase reliability. However, larger subcarrier spacing values can lead to smaller OFDM symbol durations, which can make transmissions less sensitive to phase noise and/or increase how frequently data can be transmitted. Accordingly, larger subcarrier spacing values may lead to lower latencies associated with data transmissions.

Figure 3:
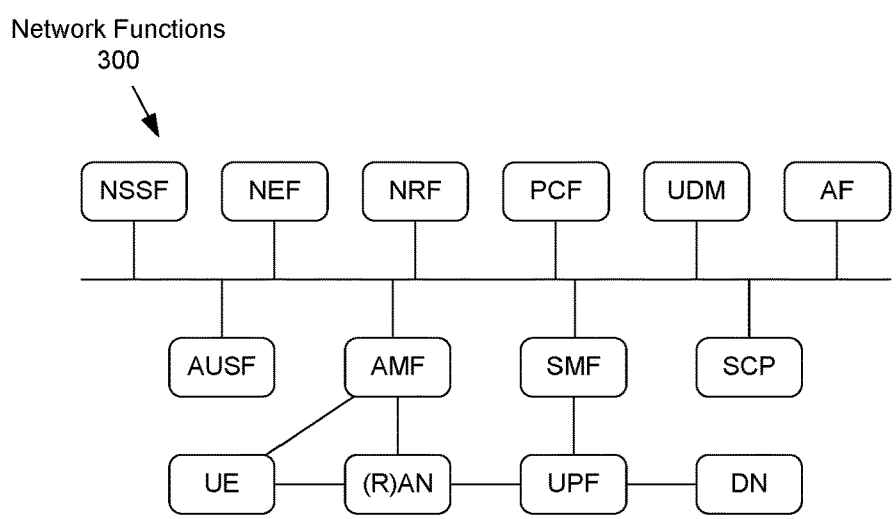
FIG. 3 shows an example service-based architecture for a 5G telecommunication network that includes multiple types of network functions.

In some examples, the telecommunication network can have a service-based system architecture in which different types of network functions operate alone and/or together to implement services. As a non-limiting example, FIG. 3 shows an example service-based architecture for a 5G telecommunication network that includes numerous types of network functions 300. For example, the telecommunication network can include network functions 300 such as an Authentication Server Function (AUSF), Access and Mobility Management Function (AMF), Data Network (DN), Unstructured Data Storage Function (UDSF), Network Exposure Function (NEF), Network Repository Function (NRF), Network Slice Selection Function (NSSF), Policy Control Function (PCF), Session Management Function (SMF), Unified Data Management (UDM), Unified Data Repository (UDR), User Plane Function (UPF), Application Function (AF), User Equipment (UE), (Radio) Access Network ((R)AN), 5G-Equipment Identity Register (5G-EIR), Network Data Analytics Function (NWDAF), Charging Function (CHF), Service Communication Proxy (SCP), Security Edge Protection Proxy (SEPP), Non-3GPP Inter-Working Function (N3IWF), Trusted Non-3GPP Gateway Function (TNGF), and Wireline Access Gateway Function (W-AGF), many of which are shown in the example of FIG. 3.

Returning to FIG. 1, some network functions 110 may execute in the core network 106, including one or more types of network functions 300 shown in FIG. 3. For example, a 5G core network can include one or more instances of an AMF, an SMF, a UPF, an AUSF, a PCF, an NS SF, and/or other network functions 110. In some examples, some network functions 110 may also, or alternately, execute at edge computing elements positioned between the base station 104 and the core network 106. In some examples, the UE 102 and/or the RAN, including the base station 104, may also be considered to be network functions 110 of the telecommunication network. Network functions 110 may be implemented using dedicated hardware, as software on dedicated hardware, or as virtualized functions on servers, cloud computing devices, or other computing devices.

The telecommunication network can include one or more network slices 112. Each network slice 112 can be a virtual and independent end-to-end logical network within the overall telecommunication network. End-to-end network slicing can create different network slices 112 by allocating resources of the core network 106, the transport link 108, and/or the RAN to different network slices 112. End-to-end network slicing can thus include one or more of core network slicing, transport slicing, and RAN slicing. As an example, a full end-to-end network slice 112 can be a Network Slice Instance (NSI), which may include subgroups of managed functions and resources associated with the core network 106, the transport link 108, and/or the RAN. For instance, an NSI can include a Network Slice Subnet Instance (NSSI) in the core network 106 and another NSSI in the RAN.

Network slicing can allow hardware resources, computing resources, radio resources, and/or other resources of the core network 106, transport link 108, and/or RAN to be shared among different network slices 112. For example, shared and/or different resources of hardware, transport links 108, and/or other network elements can be allocated to different network slices 112. Accordingly, relative to having distinct hardware, transport links 108, and/or other network elements for different end-to-end networks, operational and capital expenses can be reduced due implementing different virtual networks via different network slices 112 on shared hardware, transport links 108, and/or other network elements.

As an example, FIG. 1 shows a first network slice 112A and a second network slice 112B associated with the base station 104. In some examples, the first network slice 112A and the second network slice 112B can be RAN portions of end-to-end network slices 112, such as RAN NSSIs within NSIs that also extend through the transport link 108 and core network 106. In other examples, the first network slice 112A and the second network slice 112B can be full end-to-end network slices 112, such as NSIs that include RAN NSSIs.

Available radio resources can be allocated among different network slices 112 in the RAN, such that different network slices 112 may share common radio resources and/or be associated with distinct radio resources. For instance, in some examples, the base station 104 can be configured to use different frequency bands, or different portions of one or more frequency bands, for different network slices 112. Accordingly, although the base station 104 can be associated with both the first network slice 112A and the second network slice 112B in the example of FIG. 1, in some cases the first network slice 112A and the second network slice 112B can operate as independent virtual networks at least in part because each network slice 112 has been allocated isolated and distinct radio resources of the base station 104. As described herein, the base station 104 may dynamically allocate shared and/or distinct radio resources among network slices 112, such as the first network slice 112A and the second network slice 112B, in association with different use cases, attributes of Service Level Agreements (SLAs), and/or other factors. Although FIG. 1 shows the first network slice 112A and the second network slice 112B being associated with the base station 104, the base station 104 may also be associated with one or more other network slices 112 in addition to the first network slice 112A and the second network slice 112B.

As another example, different network slices 112 may be associated with shared network functions 110 and/or different network functions 110 at the core network 106 and/or at edge computing elements. For instance, the first network slice 112A and the second network slice 112B may be associated with a shared AMF and a shared NSSF, but be associated with different SMF, UPF, and PCF instances.

In some examples, elements of the core network 106 may initially create network slices 112. A particular network slice 112 may be associated with an SLA, a Quality of Service (QoS) level or 5G QoS Identifier (5QI) value, or other service-based requirements or goals. For instance, an SLA for a network slice 112 may define types of services to be associated with the network slice 112, target latency measurements for the network slice 112, target throughput measurements for the network slice 112, reliability goals for the network slice 112, and/or other attributes of the network slice 112. As an example, an SLA may indicate a maximum latency value, a minimum throughput value, a target maximum drop call rate or other reliability goal, security goals or levels, and/or other goals. Accordingly, in some examples the core network 106 may at least initially create or design an end-to-end network slice 112 with coordinated portions in the core network 106, the transport link 108, and the RAN that are expected by the core network 106 to provide or meet the goals for the network slice 112. As an example, the transport link 108 may dynamically route traffic associated with a network slice 112 based on loading levels of one or more network functions 110 in the core network 106 and/or based on latency requirements or goals indicated in the SLA. An SLA or other information may also indicate a specified location for a network slice 112. For example, an SLA may indicate that a network slice 112 with particular attributes should be provided in a certain city or neighborhood. Accordingly, the core network 106 may cause a corresponding network slice 112 to be created in part via at least one base station in the specified location.

As a non-limiting example, a first SLA for the first network slice 112A shown in FIG. 1 may indicate that the first network slice 112A is intended for Enhanced Mobile Broadband (eMBB) services. Because eMBB services may often involve relatively large data transmissions, but be delay-tolerant, the first SLA may indicate a relatively high throughput goal for the first network slice 112, but also allow relatively high latencies on the first network slice 112. However, in this example, a second SLA for the second network slice 112B shown in FIG. 1 may indicate that the second network slice 112B is intended for Ultra-Reliable Low Latency Communication (URLLC) services. URLLC services may prioritize low latency measurements and high reliability, and accordingly the second SLA may indicate a relatively low latency goal and a relatively high reliability goal for the second network slice 112B.

Each network slice 112 can be identified using Single Network Slice Selection Assistance Information (S-NSSAI). The S-NSSAI of a network slice 112 may indicate a Slice/ Service Type (SST) of the network slice 112. As an example, the SST of a network slice 112 may indicate that the network slice 112 is intended for eMBB services, URLLC services, or Massive Internet of Things (MIoT) services. As another example, the SST of a network slice 112 may be an SST created by a network operator, service provider, or other entity, and may identify these or any other type of service or network slice 112. In some examples, the S-NSSAI may also indicate a Slice Differentiator (SD). For example, if the telecommunication network includes multiple network slices 112 with an "eMBB" SST, each of those multiple eMBB network slices 112 may be distinguished using a different SD value, such that each network slice 112 has a different S-NSSAI overall.

In some examples, different network slices 112 may be created for different types or groups of users, such as users associated with different customers, different subscriber levels or tiers, or other categories. As an example, UEs associated with a particular company may be directed to use an eMBB network slice 112 created for that company's users, while other UEs may be directed to use one or more other eMBB network slices 112 created for general eMBB traffic or for other groups of users. This arrangement may enhance security for the company, as UEs associated with the company may be directed to use the eMBB network slice 112 created specifically for that company's users and other UEs may be directed to one or more other eMBB network slices 112. Although each network slice 112 in this example may be intended for eMBB services, the different network slices 112 may be associated with different SLAs with different throughput goals or other different attributes.

The UE 102 may be served by one or more network slices 112. As a non-limiting example, in some cases the telecommunication network may provide the first network slice 112A for eMBB services, and the second network slice 112B for URLLC services. In this example, if the UE 102 is using an URLLC service and an eMBB service simultaneously, the UE 102 may be served by both the first network slice 112A and the second network slice 112B simultaneously via the base station 104.

In some examples, elements of the core network 106 may initially select one or more network slices 112 for the UE 102. For example, when the UE 102 registers with the telecommunication network or sends a service request to the core network 106, an AMF may retrieve subscriber profile information associated with the UE 102. The subscriber profile information may indicate S-NSSAIs of network slices 112 that the UE 102 is permitted to access. The AMF may coordinate with an NSSF to select or more specific network slices 112 for the UE 102 based on the network registration or service request, and based on which S-NSSAIs are permissible for the UE 102.

As discussed above, in some cases different network slices 112 can be associated with different and isolated radio resources of the base station 104, such as different portions of available spectrum in the same band and/or in different bands. As a non-limiting example, if the base station 104 supports the n41 mid-band and the n71 low band, a portion of the frequencies in the n41 mid-band may be allocated to the first network slice 112A, while a portion of the frequencies in the n71 low band may be allocated to the second network slice 112B. As another non-limiting example, if the base station 104 supports the n66 mid-band, a first portion of the frequencies in the n66 mid-band may be allocated to the first network slice 112A, while a second portion of the frequencies in the n66 mid-band may be allocated to the second network slice 112B. As noted above, in some examples the base station 104 may provide more than two network slices 112, and as such each of a larger set of network slices 112 can be associated with different portions of the radio resources supported by the base station 104.

The base station 104 can have a real-time slice manager 114 that is configured to dynamically manage and adjust the radio resources that are locally allocated by the base station 104 to each network slice 112. The real-time slice manager 114 can use one or more input factors to determine information about one or more network slices 112 associated with the base station 104, including local radio conditions, latency measurements, throughput measurements, loading information, security levels or requirements, and/or other attributes of the network slices 112. The real-time slice manager 114 can use such information to determine whether the radio resources currently allocated by the base station 104 to each network slice 112 are meeting goals for each network slice 112. If the goals for the network slices 112 are not being met, the real-time slice manager 114 can cause the base station 104 to locally adjust and/or re-allocate the available radio resources among the network slices 112, and/or steer traffic to different spectrum bands. In some examples, the real-time slice manager 114 can use machine learning models or other artificial intelligence systems, and/or self-organizing (SON) systems, to determine attributes for one or more network slices 112, to determine how allocations of radio resources to network slices 112 should be adjusted, and/or to determine how to change other attributes of network slices 112.

As a first example, the real-time slice manager 114 may adjust available radio resources among the network slices 112 by dynamically changing one or more portions of spectrum that are allocated to one or more of the network slices 112. For example, if the first network slice 112A is associated with a first portion of spectrum and the second network slice 112B is associated with a second portion of spectrum, the real-time slice manager 114 may shrink the first portion of spectrum allocated to the first network slice 112A and correspondingly grow the second portion of spectrum allocated to the second network slice 112B. Accordingly, in this example, a portion of the spectrum that was previously allocated the first network slice 112A can be dynamically re-allocated to the second network slice 112B. In some examples, this can result in a more efficient use of the spectrum resources available to the base station 104.

As another example, the real-time slice manager 114 may dynamically adjust available radio resources among the network slices 112 by changing one or more attributes of the radio resources allocated to one or more of the network slices 112. For example, if input factors indicate that latency measurements of transmissions via a URLLC network slice 112 are approaching or are higher than a maximum latency threshold for that URLLC network slice 112, the real-time slice manager 114 may increase subcarrier spacing values used with respect to spectrum allocated to the URLLC network slice 112 in an attempt to lower the latency measurements.

In some examples, the real-time slice manager 114 may isolate radio resources of the base station 104 with respect to one or more network slices 112 based on security requirements or goals associated with the network slices 112. For instance, an SLA for a company may indicate that the company requires or has requested that its traffic be transported at a certain security level. The real-time slice manager 114 can accordingly enforce the SLA by allocating an isolated portion of radio resources to a network slice 112 associated with the company. The network slice 112 can thus be reserved for UEs associated with the company, such that the radio resources allocated to that network slice 112 are not shared by any other network slices 112. By isolating distinct radio resources to a particular network slice 112 associated with the company, a security goal indicated in the company's SLA can be enforced such that UEs that are not associated with the company may not have access to the isolated radio resources allocated to the particular network slice 112.

In some examples, the real-time slice manager 114 may also execute and/or assist with other radio resource management functions of the base station 104. For example, the base station 104 may perform radio resource management functions including admission control, load control, radio resource scheduling, and mobility management. Accordingly, in addition to managing the allocation of distinct radio resources to different network slices 112 at the base station 104, the real-time slice manager 114 may also perform, or assist with, admission control, load control, radio resource scheduling, mobility management, and other radio resource management functions with respect to different network slices 112. For example, an admission control system of the base station 104 may share information with the real-time slice manager 114, such that the real-time slice manager 114 can control assignment of traffic and/or UEs to network slices 112 and/or spectrum bands if radio resources are overloaded. For instance, the real-time slice manager 114 can assist with steering traffic during a handover operation from a current spectrum band to a different spectrum band when a UE is in a connected state, during a redirection operation via a system information block when a UE is in an idle state, and/or when a UE is in an inactive state.

In some examples, the real-time slice manager 114 may also adjust attributes of network slices 112 in the core network 106 and/or the transport link 108. For example, if input factors indicate that an instance of a network function 110 associated with a network slice 112 is overloaded in the core network 106, the real-time slice manager 114 may cause the network slice 112 to become associated with a different instance of that network function 110 in the core network 106 that is not overloaded. Similarly, the real-time slice manager 114 may determine that routing over the transport link 108 should be adjusted to achieve lower latency measurements, or for any other reason. For example, based on information about loading levels of one or more network functions 110 in the core network 106, based on latency requirements or goals indicated in an SLA, based on data processing capabilities of edge computing elements or other computing resources associated with the transport link 108 or core network 106, and/or any other input factor, the real-time slice manager 114 may instruct elements of the transport link 108 to dynamically change how traffic associated with a network slice 112 is routed.

The input factors considered by the real-time slice manager 114 can include, or be derived from, information in core network reports 116. The core network reports 116 can be sent to the real-time slice manager 114 by network functions 110 and/or other elements of the core network 106. The core network reports 116 can include real-time and/or historical data associated with network slices 112. For example, the core network reports 116 can include loading information, latency measurements, SLA information, and/or other data about one or more network slices 112 that is determined or maintained by network functions 110 or other elements of the core network 106.

In addition, or alternately, the input factors considered by the real-time slice manager 114 can include, or be derived from, information in UE reports 118. The UE reports 118 can be sent to the real-time slice manager 114 by the UE 102 and/or other UEs connected to the base station 104. The UE reports 118 can include real-time and/or historical data associated with network slices 112 that have been determined by UEs. For example, the UE reports 118 can include signal strength measurements and/or other information about local radio conditions measured by UEs, latency and/or throughput measurements taken by UEs for uplink and downlink transmissions, reliability metrics, other user experience metrics, trends or comparisons of metrics over time, and/or other data associated with network slices 112 that is determined by UEs.

In some examples, the UE reports 118 can include signal strength and other measurements that the UE 102 is configured to report to the base station 104, for instance so the base station 104 can determine if a handover procedure to a different base station 104 should be performed. However, in other examples the UE 102 can have a slice management component that is downloaded and/or installed on the UE 102 as an application, or that is part of the operating system or firmware of the UE 102. The UE's slice management component may be configured to measure or monitor signal strengths, throughput metrics, latency metrics, reliability metrics, and/or other metrics described above that are experienced by the UE with respect to different network slices in real-time, and/or over periods of time. The UE's slice management component can be configured to use this data to generate UE reports 118, and to transmit the UE reports 118 to the real-time slice manager 114 the base station 104.

The input factors considered by the real-time slice manager 114 can also, or alternatively, include RAN information about the base station 104 and/or other elements of the RAN. The RAN information can include real-time and/or historical data associated with network slices 112. For example, the RAN information can include loading information such as how many UEs are connected via each network slice 112, a maximum number of UEs that can be connected via each network slice 112, and/or capacity or utilization information indicating how many UEs are currently connected to each network slice 112 relative to the maximum number of connections for those network slices 112. In some examples, the RAN information may indicate loading information regarding processing power, memory resources, and/or other computing resources of the base station 104 itself, and/or of other RAN elements. In some examples, the RAN information may also indicate targets or goals for each network slice 112, such as information from an SLA for each network slice 112.

Accordingly, overall, the real-time slice manager 114 can consider, as input factors, real-time and/or historical data about different network slices 112 from core network reports 116, UE reports 118, and/or RAN information. The real-time slice manager 114 can be configured use such input factors to determine whether, and how, to change attributes of network slices 112. For example, the real-time slice manager 114 can determine if current allocations of radio resources to network slices 112 should be changed, and/or how to re-allocate the radio resources to the network slices 112. Non-limiting examples of input factors that the real-time slice manager 114 can consider when determining how to manage network slices 112 are shown and described below with respect to FIG. 4.

In some examples, the real-time slice manager 114 can use SON systems and/or machine learning or other artificial intelligence systems to generate, based on one or more input factors, a radio resource configuration. The radio resource configuration may indicate how to allocate radio resources of the base station 104 to network slices 112, or how to dynamically change allocations of radio resources or other attributes of one or more network slices 112. For example, the real-time slice manager 114 can may evaluate current and/or historical information from core network reports 116, UE reports 118, and/or RAN information using one or more machine learning algorithms, and predict which radio resource allocations or attributes are likely to result in achieving one or more goals associated with one or more network slices 112. The machine learning algorithms may include convolutional neural networks, recurrent neural networks, other types of neural networks, nearest-neighbor algorithms, regression analysis, Gradient Boosted Machines (GBMs), Random Forest algorithms, deep learning algorithms, and/or other types of artificial intelligence or machine learning frameworks.

In some examples, machine learning or other artificial intelligence systems of the real-time slice manager 114 can be trained on historical data, such as information in core network reports 116, UE reports 118, and/or RAN information about past time periods. The training can include identifying which factors in the historical data correlate to one or more target goals associated with one or more network slices 112, and/or which changes in attributes or resource allocations resulted in the target goals being met in the past time periods. As discussed above, target goals associated with network slices 112 can include maximum latency values, minimum throughput values, target maximum drop call rates or other reliability goals, security goals, and/or other goals associated with end-to-end performance of network slices 112. The real-time slice manager 114 can then use a trained machine learning model to evaluate new or current input factors associated with one or more network slices 112, and determine which changes can increase the likelihood of goals associated with those network slices 112 being met. The real-time slice manager 114 can thus dynamically implement the changes determined via machine learning at the base station 104.

In some examples, such new input factors and results of new changes can be added to a training data set in addition to the previous historical data, and the machine learning model can be continually, occasionally, or periodically re-trained based on the training data set as additional data about input factors and results of changes. For example, if over time a certain type of change, such as a reallocating a portion of a certain spectrum band to a certain type of network slice 112, results in a higher likelihood of meeting a target goal associated with one or more network slices 112, the machine learning algorithm can be re-trained on that new data such that it is more likely to generate a predicted radio resource configuration that recommends similar changes in similar scenarios in the future.

In some examples, the real-time slice manager 114 at the base station 104 can determine an initial allocation of radio resources of the base station 104 for each network slice 112. The real-time slice manager 114 can then dynamically re-allocate the radio resources of the base station 104 among the network slices 112 in real-time, based on local conditions, loading information, and other input factors, as described herein. For example, as local radio conditions change over time, the real-time slice manager 114 at the base station 104 can dynamically re-allocate radio resources of the base station 104 among a set of network slices 112. The real-time slice manager 114 can similarly dynamically adjust other attributes of network slices 112 in real-time based on local conditions, loading information, and other input factors, such as by changing subcarrier spacing values for spectrum allocated to one or more network slices 112, managing admission of UEs to different network slices 112 or steering network traffic to different network slices 112, changing routing of UE traffic associated with one or more network slices 112, and/or other adjustments.

In other examples, one or more elements of the core network 106 may initially indicate which radio resources of the base station 104 should be allocated to each network slice 112 when the core network 106 first creates the network slices 112. For example, an element of the core network 106 that creates the first network slice 112A and the second network slice 112B may, based on corresponding SLA information or other data, indicate to the base station 104 that a particular first portion of spectrum should be used for the first network slice 112A and that a particular second portion of spectrum should be used for the second network slice 112B. However, after that initial allocation of radio resources to network slices 112 based on instructions from the core network 106, the real-time slice manager 114 at the base station 104 can dynamically manage radio resources allocated to the network slices 112 in real-time based on local conditions, loading information, and other input factors, as described herein. For instance, the real-time slice manager 114 may dynamically adjust allocations of isolated portions of spectrum to one or more network slices 112, change routing for network slices 112 via the transport link 108, change or select network functions 110 that are associated with the network slices 112, and/or manage the network slices 112 in other ways based on one or more input factors.

Figure 4:
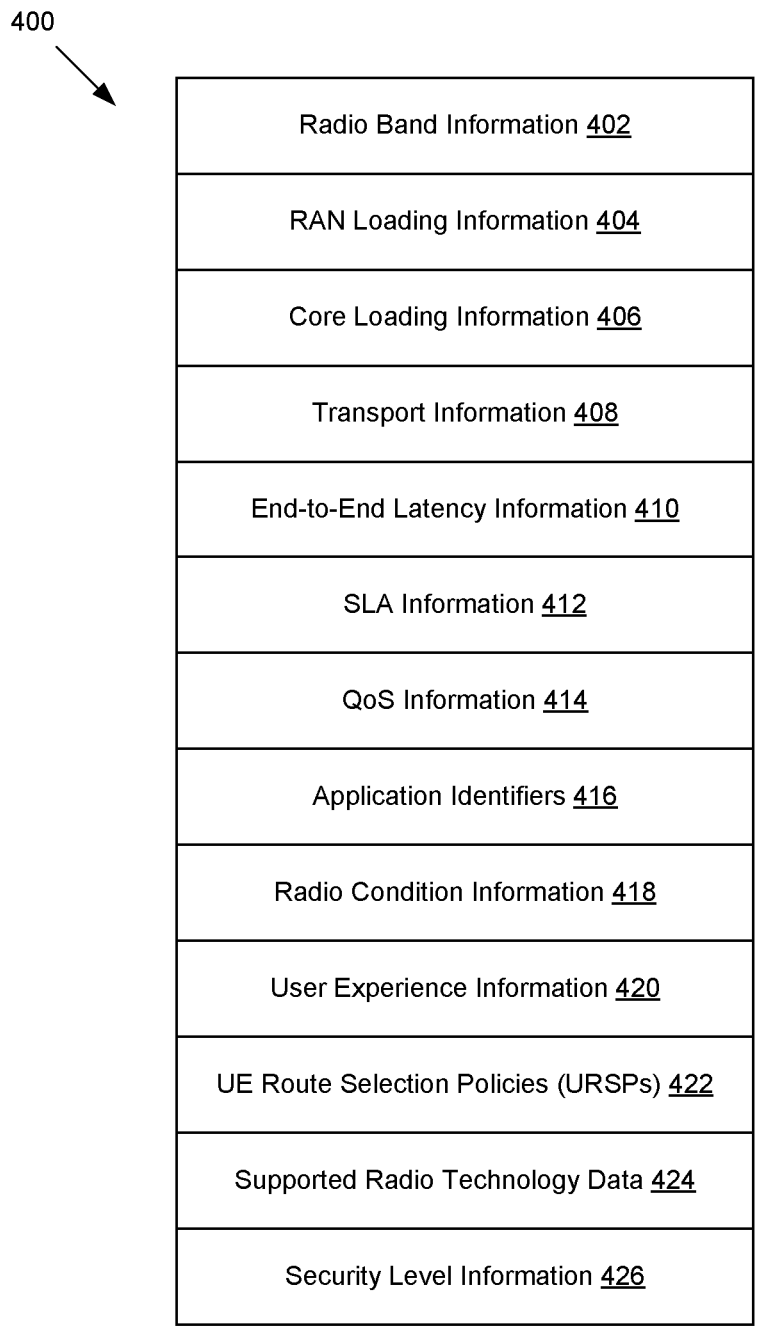
FIG. 4 shows a non-limiting example of types of input factors that a real-time slice manager at a base station can consider when managing one or more network slices.

FIG. 4 shows a non-limiting example 400 of types of input factors that the real-time slice manager 114 at the base station 104 can consider when managing one or more network slices 112. In some examples, some of all of these input factors can be used as input to a SON system, machine learning model, or other artificial intelligence component of the real-time slice manager 114. The input factors can include one or more of: radio band information 402, RAN loading information 404, core loading information 406, transport information 408, end-to-end latency information 410, SLA information 412, Quality of Service (QoS) information 414, application identifiers 416, radio condition information 418, user experience information 420, UE Route Selection Policies (URSPs) 422, supported radio technology data 424, and/or security level information 426.

The radio band information 402 can include information about which spectrum bands the base station 104 supports. For example, the radio band information 402 may indicate that the base station 104 supports the n71 low band and the n41 mid-band. In this example, the radio band information 402 can indicate that the real-time slice manager 114 can allocate portions of spectrum from the n71 band and/or the n41 band among network slices 112 associated with the base station 104. Because different base stations may support different bands, the radio band information 402 can indicate to the real-time slice manager 114 of a particular base station which bands are supported by that particular base station. The radio band information 402 may, in some examples, also indicate a current allocation of radio resources to each network slice 112. For example, the radio band information 402 may identify specific portions of radio resources currently allocated to each network slice 112, subcarrier spacing values currently used for each network slice 112, and/or other information about current radio resource allocations. The real-time slice manager 114 may use such information to determine how radio resources of the base station 104 can be adjusted with respect to one or more network slices 112.

The RAN loading information 404 can include information about capacity and utilization of the network slices 112. For example, based on current radio resources allocated to each network slice 112 by the base station 104, the RAN loading information 404 may indicate a maximum number of UEs that can be connected via each network slice 112. The RAN loading information 404 can also indicate a current number of UEs that are connected to each network slice 112. The RAN loading information 404 may also indicate a utilization level for each network slice 112, based on the current number of UEs connected via each network slice 112 relative to the maximum capacity for those network slices 112. As an example, if a particular network slice 112 has capacity for 400 UEs, and 200 UEs are currently connected via that network slice 112, the network slice 112 may currently have a 50% utilization rate. This data may indicate that if the radio resources for that network slice 112 were changed by the real-time slice manager 114 such that the maximum capacity of the network slice 112 decreased to 300 UEs while 200 UEs continued to be connected via that network slice 112, the utilization rate for the network slice 112 would increase to 75%. In some examples, the RAN loading information 404 may also indicate loading and/or usage levels associated with computing resources of the base station 104 or other RAN elements, such as memory levels, processor usage, and/or usage of other computing resources.

The core loading information 406 can include information received from network functions 110 and/or other elements of the core network 106, for example in core network reports 116. The core loading information 406 may identify individual network functions and data about their current and/or historical utilization rates, capacities, and/or other loading information. In some examples, the real-time slice manager 114 may be configured to use such core loading information 406 with respect to a network slice 112 to select a different instance of a network function 110 to be associated with the network slice 112. As a non-limiting example, the core loading information 406 may indicate that a particular UPF instance currently associated with a particular network slice 112 in the core network 106 is at or near capacity, but that a second UPF instance has more available capacity. In this situation, the real-time slice manager 114 at the base station 104 may cause or request an adjustment that leads to the network slice 112 becoming associated with the second UPF instance in the core network. Accordingly, this type of change may resolve latency problems or other issues that were caused by the overloaded UFP instance in the core network 106. The core loading information 406 can also include similar information about other types of network functions 110 that may become overloaded depending on available computing resources in the core network 106.

The transport information 408 can include information about the transport link 108 and/or edge computing elements positioned between the base station 104 and the core network 106. In some examples, the transport information 408 may indicate computing resources or capabilities of one or more edge computing elements. The real-time slice manager 114 may take such information into account when selecting or changing edge computing elements associated with a network slice 112. For instance, the real-time slice manager 114 may consider current available computing resources of edge computing elements when determining how to lower latencies for an URLLC network slice 112, and select edge computing elements that are not overloaded in order to avoid higher latencies.

In other examples, the transport information 408 may indicate that elements of the transport link 108, edge computing elements, and/or the core network 106 are arranged in a star topology, a circle topology, or any other type of topology or arrangement. In some examples, the real-time slice manager 114 may select a network function 110 for a network slice based on a smallest or fastest route through the transport link 108. For instance, if the real-time slice manager 114 is selecting a network function 110 for a URLLC network slice 112 that prioritizes low latencies, the real-time slice manager 114 may select an instance of that network function 110 that the transport information 408 indicates is the closest to the base station 104, such that data transmissions pass over the shortest available route in order to reduce latencies. In some examples, the closest instance of the network function 110 may be located at an edge computing environment instead of in the core network 106.

The end-to-end latency information 410 can include determinations of overall latencies associated with data transmissions via network slices 112. In some examples, the end-to-end latency information 410 may be indicated or derived from one or more sources, including core network reports 116, UE reports 118, measurements taken by the base station 104, and/or other sources. For example, UE reports 118 may indicate a round-trip time measured by the UE 102, which may be indicative of an end-to-end latency associated with a particular network slice 112.

However, in other examples, the real-time slice manager 114 can compile the end-to-end latency information 410 from multiple sources. For example, a UE report 118 may indicate a latency value associated with the air interface between the UE 102 and the base station 104. The real-time slice manager 114 may separately determine latencies associated with processing at the base station 104 at one or more protocol layers. The real-time slice manager 114 may further determine latencies of transmissions via the transport link 108 according to measurements taken by the base station 104 and/or transport information 408. The real-time slice manager 114 may also determine latencies associated with the core network 106, for example based on core loading information or other measurements. Accordingly, the real-time slice manager 114 can combine air interface latency information, base station latency information, transport link latency information, and/or core network latency information associated with a particular network slice 112 to determine an end-to-end latency associated with that network slice 112.

In some examples, if the end-to-end latency information 410 is above a maximum latency value for the network slice 112, or is trending towards reaching the maximum latency value within a predetermined amount of time, the real-time slice manager 114 can adjust one or more attributes of the network slice 112 to decrease the end-to-end latency of the network slice 112.

The SLA information 412 can indicate SLA requirements or goals for network slices 112. As discussed above, an SLA for a network slice 112 may define types of services to be associated with the network slice 112, target latency measurements for the network slice 112, target throughput measurements for the network slice 112, reliability goals for the network slice 112, security goals for the network slice 112, and/or other attributes of the network slice 112.

The QoS information 414 can identify QoS levels, QoS Class Identifiers (QCIs), 5QI values, and/or other QoS data associated with one or more network slices 112, services associated with one or more network slices, or traffic on one or more network slices 112. Similar to SLA information 412, the QoS information 414 may define target latencies, target throughput values, reliability goals, and other goals associated with network slices 112 and/or types of traffic and services that may be associated with those network slices 112. In some examples, the base station 104 may buffer and schedule data transmission in part based on QoS information 414, and/or SLA information 412. For example, if the QoS information 414 or SLA information 412 indicates that traffic associated with a particular network slice 112 can have latencies up to a maximum latency value, the base station 104 may hold buffered data for up to that maximum latency value while prioritizing transmission of data on other network slices 112 that may have lower maximum latency values.

The application identifiers 416 can be received from the UE 102, and may indicate particular services or applications the UE 102 is using or requesting in association with a network slice 112. For example, an application identifier 416 may be included in a UE report 118, or in a protocol data unit (PDU) service request sent by the UE 102. In some examples, the UE 102 can also send additional application-level or service-level information along with, or in addition to, an application identifier 416, such as an operating system identifier (OS ID), data network name (DNN), and/or other information. In some examples, an application identifier 416, OS ID, DNN, and/or other information may correspond to a particular service attribute or goal, such as a latency, throughput, or reliability goal.

In some examples, the goals associated with an application identifier 416 may be different from goals in an SLA for a network slice 112. For instance, although SLA information 412 may indicate that a network slice 112 is for URLLC services and/or indicate a particular maximum latency goal for the network slice 112, an application identifier 416 may indicate that the UE 102 is executing a particular application that has an even lower maximum latency goal. As an example, the application identifier 416 may indicate that the UE 102 is executing, via the first network slice 112A, a cloud gaming application that operates best at latencies under 15 ms. If the SLA information 412 for the first network slice 112A identifies a maximum latency of 30 ms, the real-time slice manager 114 may nevertheless adjust radio resources allocated to one or more network slices 112 at the base station 104 to achieve latencies via the first network slice 112A that are under the 15 ms goal associated with the application identifier 416, rather than the higher 30 ms goal that would otherwise be associated with the first network slice 112A.

In other examples, the real-time slice manager 114 can use application identifiers 416 for admission control, loading control, or other radio resource management functions. For example, if the UE 102 sends a first PDU session request with an application identifier 416 for a voice call application and a second PDU session request with an application identifier 416 for a gaming application, the real-time slice manager 114 may determine that the UE 102 should be admitted to an eMBB network slice 112 for traffic of the voice call application and to a URLLC network slice 112 for traffic of the gaming application.

The radio condition information 418 can be signal strength information and other information provided by the UE 102 and/or other UEs connected to the base station 104. For example, the UE 102 can provide UE reports 118 that indicate signal strengths associated with one or more network slices 112. If a particular portion of spectrum is allocated to the first network slice 112A, but the radio condition information 418 indicates that UEs have experienced low signal strengths with respect to that particular portion of spectrum, the real-time slice manager 114 may determine to re-allocate available spectrum to improve signal strengths experienced by UEs with respect to the first network slice 112A.

The user experience information 420 can include latency measurements, throughput measurements, reliability measurements, and/or metrics that may impact the experiences of users of UEs connected to the base station 104 with respect to particular network slices 112. In some examples, the user experience information 420 can be derived from UE reports 118 submitted by UEs. In other examples, the user experience information 420 can also, or alternately, be based on measurements performed by the base station 104 with respect to particular network slices 112.

The URSPs 422 may include a URSP that indicates how traffic associated with the UE 102 is to be routed to and from the base station 104 with respect to one or more network slices 112, for example over the transport link to one or more elements of the core network, to elements of edge computing devices, and/or other upstream elements. In some examples, a URSP 422 may also indicate which network slices 112 or routes should be used for traffic of the UE 102 with respect to one or more services, application identifiers 416, data network names, and/or other factors. As an example, an URSP 422 may indicate that traffic should be routed to a certain upstream node or network function 110 in association with a network slice 112 when the traffic is associated with a certain application identifier 416. Accordingly, the real-time slice manager 114 may route the traffic to the upstream node or network function 110 specified in the URSP 422 as being associated with the application identifier 416, and/or cause the network slice 112 to be adjusted such that the specified upstream node or network function 110 becomes associated with the network slice 112.

The supported radio technology data 424 may indicate which types of radio technologies the base station 104 and/or the UE 102 supports. For example, the supported radio technology data 424 may indicate whether the base station 104 and/or the UE 102 supports dual connectivity (DC), carrier aggregation (CA), Multiple Input Multiple Output (MIMO), link adaptation, subcarrier spacing reselection, and/or other types radio technologies or techniques. The real-time slice manager 114 may determine or change attributes of network slices 112 based on supported radio technology data. For example, the real-time slice manager 114 may allocate isolated portions of one or more spectrum bands to different network slices 112 used by the same UE 102 if the supported radio technology data 424 indicates that the UE 102 can simultaneously access those isolated portions.

The security level information 426 can indicate a current security level associated with a network slice 112, or a security goal associated with a network slice 112. In some examples, the security level information 426 can be derived from SLA information 412 that indicates a desired security level or goal associated with a network slice 112. In other examples, the security level information 426 can be a current security level associated with a network slice 112, or be a security goal derived from any other source. In some examples, the security level information may indicate that a particular network slice 112 should be allocated isolated frequencies that are not shared by other network slices 112, identify classes of customers or UEs 102 that can be admitted to the network slice 112, and/or other security-related information associated with the network slice 112.

Overall, the real-time slice manager 114 at the base station 104 can use one or more of the input factors shown in FIG. 4 to manage network slices 112 associated with the base station 104. As a first example, the real-time slice manager 114 may determine from SLA information 412 that traffic on the first network slice 112A should have latency measurements that are under a maximum latency value defined in an SLA for the first network slice 112A. However, the real-time slice manager 114 may determine from radio band information 402, RAN loading information 404, end-to-end latency information 410, and/or other input factors that the current radio resources allocated to the first network slice 112A are causing latency measurements of traffic of the first network slice 112A to approach or exceed a maximum latency value for the first network slice 112A. The real-time slice manager 114 may accordingly re-allocate available radio resources among network slices 112 in an attempt to reduce the latency measurements associated with traffic on the first network slice 112A.

For instance, real-time slice manager 114 may determine from RAN loading information 404 that half of a maximum number of UEs for the second network slice 112B are currently connected via the second network slice 112B, such that the second network slice 112B is currently under-utilized. Accordingly, the real-time slice manager 114 may re-allocate some of the radio resources assigned to the second network slice 112B to the first network slice 112A. The radio resources re-allocated by the real-time slice manager 114 from the second network slice 112B to the first network slice 112A, such as one or more portions of spectrum bands supported by the base station 104, may cause latency measurements of traffic of the first network slice 112A to fall below the maximum latency value for the first network slice 112A. Additionally, because the second network slice 112B was at 50% capacity prior to the re-allocation, the second network slice 112B may still be at less than full capability after the re-allocation. The re-allocation of radio resources by the real-time slice manager 114 may therefore be unlikely to impact user experiences of UEs connected via the second network slice 112B, and may increase efficiency with respect to overall usage of the radio resources associated with the base station 104. In some examples, the re-allocation can be based on a prediction from a machine learning model that determines, based on being trained on historical data, that similar re-allocations have resulted in latency reductions and/or a more efficient overall usage of spectrum bands in similar scenarios in the past.

As another example, the real-time slice manager 114 may use one or more input factors during admission control functions to select network slices 112 and/or spectrum bands for the UE 102. For instance, at a first point in time the UE 102 may submit a PDU session request for an eMBB service, which may identify multiple S-NSSAIs of network slices 112 that support eMBB services. However, the UE 102 may be located at a position that is covered by low band spectrum of the base station 104, but is not covered by a high band of the base station 104. Accordingly, the real-time slice manager 114 may cause the base station 104 to admit the UE 102 to an eMBB network slice 112 that has been allocated spectrum in the low band, but reject admitting the UE 102 to a different eMBB network slice 112 that has been allocated spectrum in the high band. At a later point in time, the UE 102 may have moved to a different location that is covered by the high band, and may submit a new PDU session request for a vehicle-to-everything (V2X) service. The real-time slice manager 114 may cause the base station 104 to admit the UE 102 to third network slice 112 that has been allocated spectrum in the high band and may be intended for V2X services. Accordingly, the UE 102 may have first been admitted to an eMBB network slice 112 in a low band associated with the base station 104, and later been admitted to another network slice 112 in a high band of the same base station 104 for V2X services while the UE 102 is still being serviced by the low-band eMBB network slice 112.

Example Architecture

Figure 5:
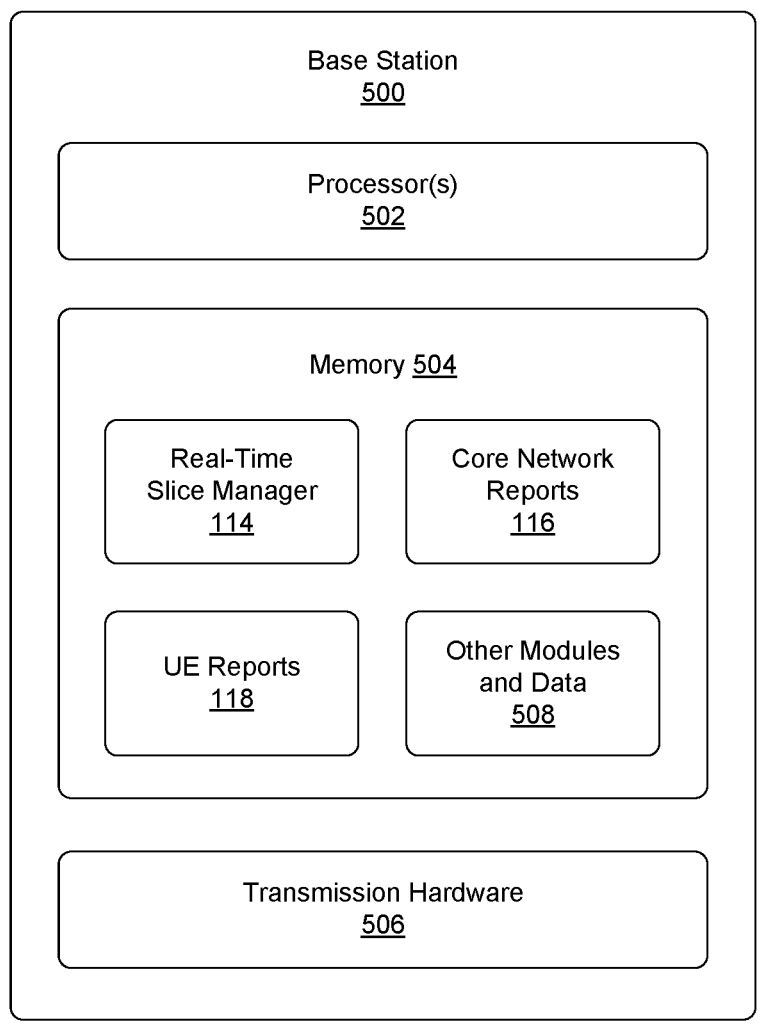
FIG. 5 shows an example system architecture for a base station.

FIG. 5 shows an example system architecture for a base station 500, in accordance with various examples. In some examples, the base station 500 can be a 5G base station, such as a gNB. In other examples, the base station 500 can be an LTE base station, such as an eNB. In still other example, the base station 500 can be compatible with any other type or generation of radio access technology. As shown, the base station 500 can include processor(s) 502, memory 504, and transmission hardware 506.

The processor(s) 502 may be a central processing unit (CPU) or any other type of processing unit. Each of the one or more processor(s) 502 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 502 may also be responsible for executing all computer-executable instructions and/or computer applications stored in the memory 504.

In various examples, the memory 504 can include system memory, which may be volatile (such as RAM), non-volatile (such as ROM, flash memory, etc.) or some combination of the two. The memory 504 can also include additional data storage devices (removable and/or non-removable) such as, for example, magnetic disks, optical disks, or tape. Memory 504 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium which can be used to store the desired information and which can be accessed by the base station 500. Any such non-transitory computer-readable media may be part of the base station 500.

The memory 504 can store computer-readable instructions and/or other data associated with operations of the base station 500. For example, the memory 504 can store data for the real-time slice manager 114, including computer-executable instructions for the real-time slice manager 114, data associated with input factors considered by the real-time slice manager 114, such as the input factors shown in FIG. 4, and/or any other data associated with the real-time slice manager 114. In some examples, memory 504 can also store core network reports 116 and UE reports 118 received by the base station 500. As described herein, the real-time slice manager 114 at the base station 500 can use the core network reports 116, the UE reports 118, and/or other input factors to manage network slices 112 associated with the base station 500. In some examples, the memory 504 may store computer-executable instructions for a SON system, a machine learning model, and/or an artificial intelligence system configured to evaluate the input factors and determine a configuration for managing the network slices 112. The memory 504 may also store a training data set used to train and/or retrain machine learning algorithms based on input factors and/or results of changes to network slices 112 over time.

The memory 504 can further store other modules and data 508, which can be utilized by the base station 500 to perform or enable performing any action taken by the base station 500. The modules and data 508 can include a platform, operating system, firmware, and/or applications, and data utilized by the platform, operating system, firmware, and/or applications.

The transmission hardware 506 can include one or more modems, receivers, transmitters, antennas, error correction units, symbol coders and decoders, processors, chips, application specific integrated circuits (ASICs), programmable circuit (e.g., field programmable gate arrays), firmware components, and/or other components that can establish connections with one or more UEs, other base stations, elements of the core network 106, and/or other network elements, and can transmit data over such connections. For example, the transmission hardware 506 can establish one or more connections with the UE 102 over air interfaces, and a connection with the core network 106 via the transport link 108. The transmission hardware 506 can also support transmissions using one or more radio access technologies, such as 5G NR or LTE, as discussed above.

The transmission hardware 506 may also support one or more spectrum bands, such as low bands, mid-bands, and/or high bands. The transmission hardware 506 may be configured to allocate different portions of the one or more spectrum bands to different network slices 112, or otherwise adjust or manage radio resources allocated to one or more network slices 112, based on determinations by the real-time slice manager 114 described herein. For example, the real-time slice manager 114 can cause the transmission hardware 506 to re-allocate or otherwise adjust radio resources of the base station 500 associated with one or more network slices 112.

Example Operations

Figure 6:
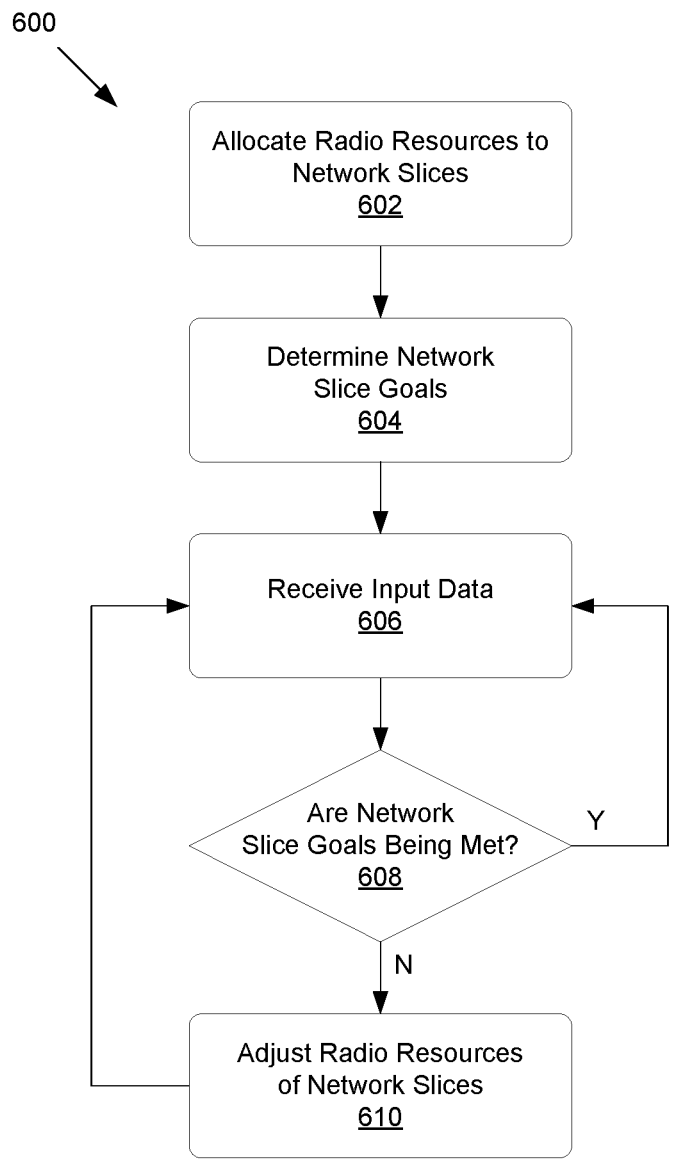
FIG. 6 shows a flowchart of an example method that a real-time slice manager at a base station can use to manage network slices.

FIG. 6 shows a flowchart of an example method 600 that the real-time slice manager 114 at the base station 104 can use to manage network slices 112. At block 602, the base station 104 can allocate radio resources of the base station 104 to one or more network slices 112. In some examples, the base station 104 can initially allocate radio resources to the one or more network slices 112 based on instructions from the core network 106. For example, the base station 104 can at least initially allocate radio resources to the one or more network slices 112 as instructed by the core network 106. However, in other examples the real-time slice manager 114 may determine which radio resources to initially allocate to the one or more network slices 112 when the one or more network slices 112 are created.

At block 604, the real-time slice manager 114 at the base station 104 can determine goals for the network slices 112. For example, based on SLA information 412, QoS information 414, and/or other input factors, the base station 104 may determine latency goals, throughput goals, reliability goals, security goals, and/or other goals associated with the network slices 112. As a non-limiting example, the real-time slice manager 114 may determine that the first network slice 112A shown in FIG. 1 is intended for URLLC services, has a relatively low maximum latency goal, and has a relatively high reliability goal. However, the real-time slice manager 114 may also determine in this example that the second network slice 112B shown in FIG. 1 is intended for eMBB services and has a relatively high throughput goal, but that higher latencies may be tolerated on the second network slice 112B for traffic of eMBB services than would be tolerated for traffic of URLCC services on the first network slice 112A.

At block 606, the real-time slice manager 114 can receive input data associated with the one or more network slices 112. The input data can include information that is included in, or can be derived from, core network reports 116 and/or UE reports 118. The input data can also other information measured or calculated by the real-time slice manager 114 or other elements of the base station 104. In some examples, the input data received at block 606 can include one or more of the input factors shown and described above with respect to FIG. 4, including radio band information 402, RAN loading information 404, core loading information 406, transport information 408, end-to-end latency information 410, SLA information 412, QoS information 414, application identifiers 416, radio condition information 418, user experience information 420, URSPs 422, supported radio technology data 424, and/or security level information 426.

At block 608, the real-time slice manager 114 can determine if the goals for the network slices 112 determined at block 604 are being met, based on the input data received at block 606. For example, if the real-time slice manager 114 determined that the first network slice 112A has a particular maximum latency goal, the real-time slice manager 114 can determine a current or average latency associated with the first network slice 112A, for example based on end-to-end latency information 410 and/or other input factors. The real-time slice manager 114 can determine if the current or average latency associated with the first network slice 112A is below the maximum latency goal for the first network slice 112A. As other examples, the real-time slice manager 114 can determine if transmission error rates or call drop rates are above or below a reliability goal for a network slice 112, determine if throughput measurements are above or below a throughput goal for a network slice 112, or otherwise compare input data associated with network slices 112 against goals for the network slices 112.

If the real-time slice manager 114 determines at block 608 that the goals for the network slices 112 are currently being met, the real-time slice manager 114 can continue receiving new input data associated with the network slices 112 at block 606 and determining whether the new input data indicates that the goals for the network slices 112 are being met at block 608. However, if the real-time slice manager 114 determines at block 608 that the goals for at least one network slice 112 are not currently being met, the real-time slice manager 114 can move to block 610.

At block 610, in response to determining that the goals for at least one network slice 112 are not being met, the real-time slice manager 114 can adjust the radio resources allocated by the base station 104 to one or more network slices 112. For instance, if the real-time slice manager 114 determined at block 608 that a current or average latency associated with the first network slice 112A is above a maximum latency goal for the first network slice 112A, the real-time slice manager 114 can adjust the radio resources allocated by the base station 104 to the first network slice 112A and/or other network slices 112 in an attempt to decrease the latencies associated with the first network slice 112A. In some examples, the real-time slice manager 114 may use a SON system, machine learning system, or other artificial intelligence to evaluate the input factors received at block 606 and determine changes to resource allocations or other attributes associated with one or more network slices 112 that are predicted to result in the network slices 112 meeting the goals determined at block 604 going forward.

As a first non-limiting example, the real-time slice manager 114 may determine that high latencies associated with the first network slice 112A may be due to locally poor radio conditions between the base station 104 and a UE 102, for example based on radio condition information 418 received in a UE report 118. Accordingly, the real-time slice manager 114 may determine to reallocate a portion of spectrum from the second network slice 112B to the first network slice 112A, as the reallocated portion of spectrum may lead to a lowering of the latency measurements associated with the first network slice 112A, particularly if radio condition information 418 indicates that the reallocated portion of spectrum has been associated with higher signal strength measurements than the portion of spectrum previously associated with the first network slice 112A.

As a second non-limiting example, the real-time slice manager 114 may address poor latency measurements associated with the first network slice 112A by widening the subcarrier spacing, and/or adjusting other attributes, of the spectrum allocated to the first network slice 112A in an attempt to lower the latency measurements associated with the first network slice 112A. In some examples, the real-time slice manager 114 may adjust such attributes of spectrum allocated to a single network slice 112 in addition to, or as an alternative to, reallocating portions spectrum among two or more network slices 112.

In other examples, if the real-time slice manager 114 may address low throughput metrics and/or poor reliability metrics associated with a particular network slice 112 by reallocating portions of spectrum from one or more other network slices 112 to that particular network slice 112, which may lead to throughput increases and/or higher reliability with respect to the particular network slice 112. Similarly, the real-time slice manager 114 may adjust subcarrier spacing or other attributes of spectrum allocated to the particular network slice 112 to attempt to increase throughput and/or reliability with respect to the particular network slice 112.

In still other examples, the real-time slice manager 114 may adjust radio technologies used in association with one or more network slices 112. For example, the real-time slice manager 114 may determine from supported radio technology data 424 that the base station 104 and the UE 102 support DC, CA, MIMO, link adaptation, subcarrier spacing reselection, and/or other radio technologies. The real-time slice manager 114 may determine that one or more such technologies are not currently in use with respect to one or more network slices 112, but that using them may result in achieving the goals for those network slices 112. Accordingly, the real-time slice manager 114 may instruct the base station 104 and/or the UE 102 to change the radio technologies used with respect to one or more network slices 112.

In some examples, the real-time slice manager 114 may balance factors associated with different network slices 112 when determining whether, and/or how, to reallocate spectrum among multiple network slices 112. For example, input factors may indicate that the first network slice 112A is not meeting latency or throughput goals, but that such goals for the first network slice 112A could be met if spectrum is added to the first network slice 112A. However, if RAN loading information 404 indicates that the second network slice 112B has a high utilization rate and a third network slice 112 has a low utilization rate, the real-time slice manager 114 may choose to reallocate spectrum from the less heavily-used third network slice 112 to the first network slice 112, to avoid negatively impacting the second network slice 112B that is already under a relatively heavy load.

After adjusting radio resources allocated to one or more network slices 112 at block 610, the real-time slice manager 114 can receive new input data associated with the network slices 112 at block 606. The real-time slice manager 114 can thus determine whether the new input data indicates that the adjustments made at block 610 have caused to goals for the network slices 112 to be met at block 608. If the adjustments made at block 610 were successful at causing the goals for the network slices 112 to be met, the real-time slice manager 114 can loop through blocks 606 and 608 until the input data indicates that goals for the network slices 112 are not being met, at which point the real-time slice manager 114 can make further adjustments at block 610. However, if the adjustments made at block 610 were not successful at causing the goals for the network slices 112 to be met, the real-time slice manager 114 can make further adjustments at block 610. In some cases, results of adjustments made at block 610 can be used to re-train machine learning or other artificial intelligence models used in the real-time slice manager 114.

As an example, the real-time slice manager 114 may initially reallocate spectrum from the second network slice 112B to the first network slice 112A, such that the amount of isolated radio resources allocated to the first network slice 112A increases, in an attempt to reduce latencies associated with the first network slice 112A. However, if subsequent input data indicates that latencies associated with the first network slice 112A continue to be above a maximum latency value for the first network slice 112A, the real-time slice manager 114 can further adjust the spectrum allocated to the first network slice 112A to attempt to drop the latencies below the maximum latency value for the first network slice 112A. For instance, the real-time slice manager 114 may further re-allocate spectrum from one or more other network slices 112 to the first network slice 112A, may adjust subcarrier spacing values or other attributes with respect to the spectrum allocated to the first network slice 112A, and/or may take other actions to adjust the spectrum allocated to the first network slice 112A.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method, comprising:
allocating, by a base station of a telecommunication network, radio resources of the base station to a network slice, the radio resources including radio spectrum for supporting one or more radio access technologies of the base station and a user equipment (UE) connected to the base station;
determining, by the base station, a goal associated with the network slice;
receiving, by the base station, one or more input factors associated with the network slice including supported radio technology data of the UE;
determining, by the base station and based on the one or more input factors, that;
the goal is not being met, and
the UE is capable of simultaneously accessing isolated portions of one or more spectrum bands; and
in response to determining that the goal is not being met and the UE is capable of simultaneously accessing the isolated portions of one or more spectrum bands, adjusting, by the base station, the radio resources allocated to the network slice by reallocating the isolated portions of one or more spectrum bands to different network slices used by the UE, the isolated portions of one or more spectrum bands to be used simultaneously by the UE.

2. The method of claim 1, wherein the adjusting further comprises changing a subcarrier spacing associated with a portion of the radio spectrum allocated to the network slice.

3. The method of claim 1, wherein the goal is associated with at least one of: latency, throughput, reliability, or security.

4. The method of claim 1, wherein the one or more input factors includes a service level agreement (SLA) associated with the network slice, and the base station determines the goal based on the SLA.

5. The method of claim 1, wherein the one or more input factors further includes one or more of:
radio access network loading information,
core network loading information,
transport information,
latency information,
quality of service information,
an application identifier,
radio condition information,
user experience information,
a user equipment route selection policy,
or
security level information.

6. The method of claim 1, wherein the base station receives the one or more input factors from at least one of:
one or more network functions of a core network, or
the UE connected to the base station.

7. The method of claim 1, further comprising:
generating, by the base station using a machine learning model, a configuration based on the one or more input factors, wherein the machine learning model predicts that the configuration will result in meeting the goal associated with the network slice; and
adjusting, by the base station, the radio resources allocated to the network slice based on the configuration.

8. The method of claim 1, further comprising changing, by the base station, one or more network functions associated with the network slice based on the one or more input factors.

9. The method of claim 1, further comprising changing, by the base station, network routing associated with the network slice based on the one or more input factors.

10. The method of claim 1, further comprising changing, by the base station, one or more radio technologies used by one or more of the base station or the UE in association with the network slice based on the one or more input factors.

11. A base station of a telecommunication network, comprising:
one or more processors;
memory storing computer-executable instructions that, when executed by the one or more processors, cause the one or more processors to perform operations comprising:
allocating radio resources of the base station to a network slice, the radio resources including spectrum for supporting one or more radio access technologies of the base station and a user equipment (UE) connected to the base station;
determining a goal associated with the network slice;
receiving one or more input factors associated with the network slice including supported radio technology data of the UE;
determining, based on the one or more input factors, that:
the goal is not being met, and
the UE is capable of simultaneously accessing isolated portions of one or more spectrum bands; and
in response to determining that the goal is not being met and the UE is capable of simultaneously accessing the isolated portions of one or more spectrum bands, adjusting the radio resources allocated to the network slice by reallocating the isolated portions of one or more spectrum bands to different network slices used by the UE, the isolated portions of one or more spectrum bands to be used simultaneously by the UE.

12. The base station of claim 11, wherein the goal is associated with at least one of: latency, throughput, reliability, or security.

13. The base station of claim 11, wherein the one or more input factors are received from one or more of: network functions of a core network, or the UE connected to the base station.

14. One or more non-transitory computer-readable media storing computer-executable instructions that, when executed by one or more processors of a base station of a telecommunication network, cause the one or more processors to perform operations comprising:
allocating radio resources of the base station to a network slice, the radio resources including spectrum for supporting one or more radio access technologies of the base station and a user equipment (UE) connected to the base station;
determining a goal associated with the network slice;
receiving one or more input factors associated with the network slice including supported radio technology data of the UE;
determining, based on the one or more input factors, that:
the goal is not being met, and
the UE is capable of simultaneously accessing isolated portions of one or more spectrum bands; and
in response to determining that the goal is not being met and the UE is capable of simultaneously accessing the isolated portions of one or more spectrum bands, adjusting the radio resources allocated to the network slice by reallocating the isolated portions of one or more spectrum bands to different network slices used by the UE, the isolated portions of one or more spectrum bands to be used simultaneously by the UE.

15. The one or more non-transitory computer-readable media of claim 14, wherein the operations further comprise changing one or more radio technologies used by one or more of the base station or the UE in association with the network slice based on the one or more input factors.

16. The one or more non-transitory computer-readable media of claim 14, wherein the one or more input factors are received from one or more of: network functions of a core network, or the UE connected to the base station.

17. The base station of claim 11, wherein:
the one or more input factors includes a service level agreement (SLA) associated with the network slice, and
the operations further comprise:
determining the goal based on the SLA.

18. The base station of claim 11, wherein the operations further comprise:
generating, using a machine learning model, a configuration based on the one or more input factors, wherein the machine learning model predicts that the configuration will result in meeting the goal associated with the network slice; and
adjusting the radio resources allocated to the network slice based on the configuration.

19. The one or more non-transitory computer-readable media of claim 14, wherein the adjusting further comprises changing a subcarrier spacing associated with a portion of the radio spectrum allocated to the network slice.

20. The one or more non-transitory computer-readable media of claim 14, wherein the operations further comprise:
changing one or more network functions associated with the network slice based on the one or more input factors.

* * * * *